April 1, 1941.  R. E. BRIGGS  2,237,172
SCUM REMOVER FOR SEWAGE SETTLING TANKS
Filed May 21, 1936
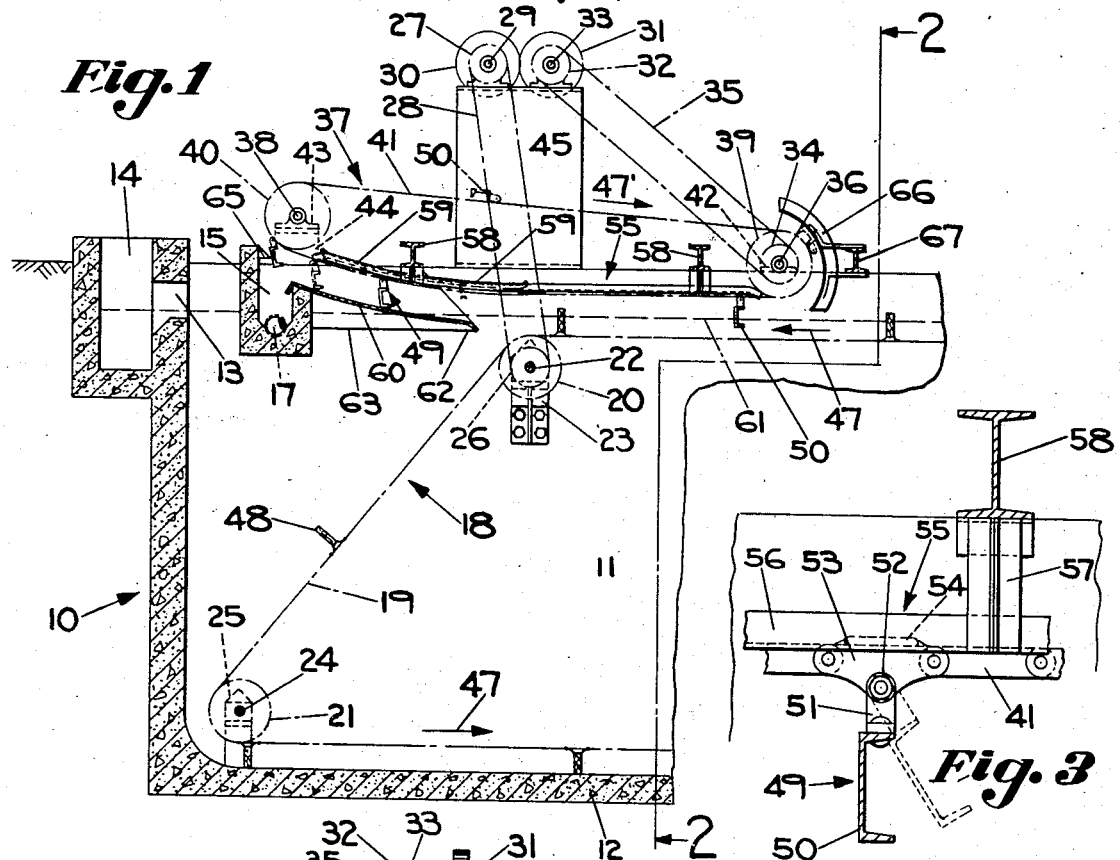
Fig. 1
Fig. 3
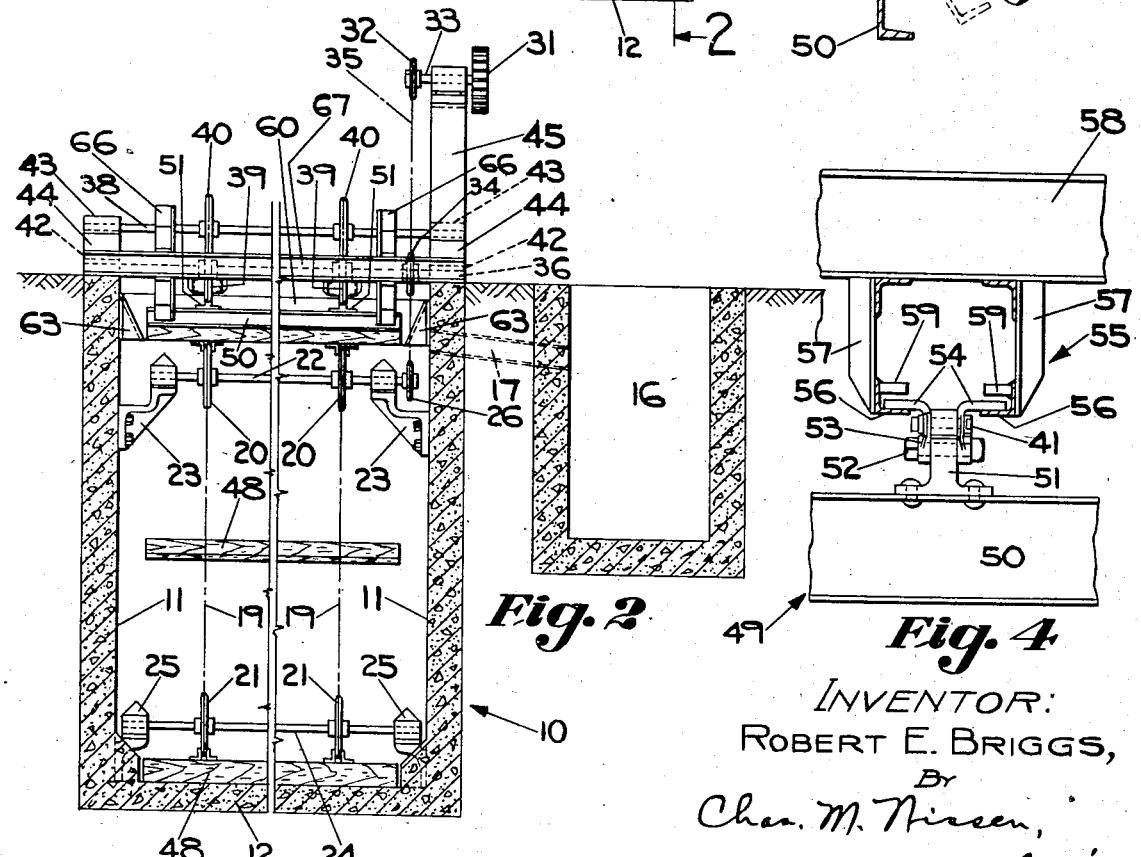
Fig. 2
Fig. 4
INVENTOR:
ROBERT E. BRIGGS,
By
Chas. M. Nissen,
ATT'Y.

Patented Apr. 1, 1941

2,237,172

UNITED STATES PATENT OFFICE 2,237,172

SCUM REMOVER FOR SEWAGE SETTLING TANKS

Robert E. Briggs, Columbus, Ohio, assignor to The Jeffrey Manufacturing Company, a corporation of Ohio Application May 21, 1936, Serial No. 80,979

11 Claims. (Cl. 210—3)

This invention relates to a new and improved scum remover for sewage settling or sedimentation tanks.

An object of the invention is to provide a pair of coordinated conveyors both moving in the same plane, one of which is adapted to direct scum which accumulates on top of sewage in a settling tank to the effluent end thereof, and the other of which is adapted to convey said scum to a transversely extending scum trough at said effluent end thereby to remove the scum from the tank.

Another object of the invention is to provide conveyor means to remove accumulating scum from the sewage settling tank and to avoid entirely the presence of any "dead spots" within the tank where scum might accumulate.

Still another object of the invention is to provide a settling tank for sewage with a transversely extending scum trough and with a scum chute leading from the tank to said scum trough.

Other objects of the invention will appear hereinafter, the novel features and combinations being set forth in the appended claims.

In the accompanying drawing—

Fig. 1 is a longitudinal sectional view showing the effluent end of a sewage settling tank and apparatus therein comprising my invention;

Fig. 2 is a transverse sectional elevational view taken on the line 2—2 of Fig. 1 looking in the direction of the arrows;

Fig. 3 is an enlarged longitudinal sectional view of a pivoted flight of my invention; and Fig. 4 is a transverse elevational view of the device of Fig. 3.

This application comprises an improvement on my application, Serial No. 701,549 for Conveyors, filed December 8, 1933, now Patent No. 2,160,534 granted May 30, 1939.

As seen in the drawing, I provide a settling or sedimentation tank 10 having side walls 11, 11 and a bottom 12. Said tank 10 is preferably made of poured concrete.

Adjacent one end of said tank 10 is an effluent port 13 which leads to an effluent trough 14. Positioned in front of said effluent port 13 is a scum trough 15 which extends transversely of the settling tank 10 and entirely across the effluent end thereof. The scum trough 15 communicates with a grease well 16 which may also be of concrete, by means of a conduit 17. It will thus be understood that any scum or grease received by the scum trough 15 will flow by gravity into the grease well 16.

Within the settling tank 10, which is preferably of elongated construction, I provide a conveyor 18 formed by a pair of endless chains 19, 19 supported and guided by sprockets of which two pairs are seen at 20, 20 and 21, 21. It will be understood that there are also two pairs of sprockets at the influent or other end of the tank 10 to support the chains 19, 19. Said sprockets 20, 20 are mounted upon a transversely extending shaft 22 journaled in bearings carried by appropriate brackets 23, 23 from the side walls 11, 11 of the tank 10. The sprockets 21, 21 are mounted upon a shaft 24 journaled in bearings carried by brackets 25, 25 supported adjacent the bottoms of side walls 11, 11.

The shaft 22 also carries a sprocket 26 which is connected to another sprocket 27 by chain 28, said sprocket 27 driving the shaft 29, which carries a gear 30. The gear 30 intermeshes with a gear 31 of the same size to which is connected a sprocket 32, by means of shaft 33. Sprocket 32 is interconnected with a drive sprocket 34 by a chain 35, said drive sprocket 34 being attached to a shaft 36 of a second conveyor mechanism 37. Said second conveyor mechanism 37 comprises shafts 36 and 38, the former of which carries a pair of sprockets 39, 39, and the latter of which carries a pair of sprockets 40, 40. A pair of continuous chains 41, 41 is carried by said sprockets 39, 39 and 40, 40.

The shaft 36 will be mounted in appropriate journal bearings 42, 42 carried on the tops of side walls 11, and the shaft 38 will be carried upon appropriate journal bearings 43, 43 carried by appropriate brackets 44, 44 which are carried by the tops of said side walls 11.

The intermeshing gears 30 and 31 and the shafts 29 and 33 will be carried in appropriate journal bearings carried by a bracket 45 on top of one of the side walls 11. It will thus be seen that the two conveyors 18 and 37 will be interconnected so that they both move in unison. It may also be mentioned that these two conveyors are driven at the same speed.

To drive said conveyors 18 and 37 a well-known form of drive means, shown in detail in my above mentioned application, will be provided adjacent the influent end of the tank 10 and drive the conveyor 18 directly. Conveyor 37 will therefore be driven from conveyor 18 by virtue of the interconnection above described. In the driving of the conveyors their directions of travel will be as indicated by the arrows 47 and 47'.

In addition to the elements previously described, the conveyor 18 is provided with a plurality of transversely extending flights 48, and the conveyor 37 is provided with a plurality of transversely extending flights 49. The flights 48 and 49 are so arranged on the conveyors 18 and 37 that they do not strike each other, yet traverse a certain common area adjacent the effluent end of the tank 10.

Attention is directed particularly to Figs. 1, 3 and 4 of the drawing and to the construction of the flights 49 and the supports therefor.

Each of said flights 49 comprises a channel member 50 having a length substantially equal to the width of the tank 10, and having near each end a supporting bracket 51 which is pivoted by a bolt 52 to a special link 53 of a chain 41. Said link 53 is formed by a pair of side straps each having a laterally extending wing 54 adapted to ride on a guiding and supporting rail 55 formed by a pair of longitudinally extending angle members 56 which are supported by hangers 57 from transversely extending I-beams 58. There will, of course, be two rails 55, one for each chain 41.

At the end adjacent the hereinafter described chute 60, the rails 55 have retaining flanges 59 carried by the angle members 56 to insure contact between the pivoted flights 49 and said chute 60.

Also cooperating with the flights 49 of conveyor 37 is a sloping chute 60 which extends substantially entirely across the effluent end of the tank 10 and has one end leading to the scum trough 15 and above the normal level of the sewage in the tank 10, as indicated by the dotted line 61, with the other end thereof below the normal sewage level. The lower or free end of the chute 60 is preferably tapered downwardly, to form a depending straight edged transverse lip, as seen at 62, to direct any floating material, such as scum or grease, onto the chute 60 as influenced by the flights 49 of the conveyor 37.

It may also be noted that the chute 60 is attached to side walls 11, 11 by vertical plates 63, 63.

In addition, the scum trough 15 has adjacent the top edge thereof a transversely extending metal wiper 65 adapted to contact the forward surface of the flights 49 and to scrape them clean of any adhering material which will then drop into said scum trough 15.

It will be evident that adjacent the upper run of the conveyor 37 the flights 49 will lie flat on the chains 41, as seen in Fig. 1. To prevent the flights 49 suddenly pivoting and splashing into the liquid as they round the sprockets 39, I provide a pair of spaced guiding cams 66 carried on a transversely extending I-beam 67 which insure a gradual swinging of said flights 49 from a horizontal position to a vertical position, which latter position they assume when traveling along the lower run of the conveyor 37.

In the operation of the device, sewage will be introduced into the settling tank 10 at the influent end remote from the end illustrated in the drawing. The sewage will be allowed to settle in said tank with the organic matter settling to the bottom 12, and the liquid sewage passing through the effluent port 13 and the effluent trough 14. After the sewage has been allowed to settle for an appreciable time the conveyors 18 and 37 will be driven, the drive being directly upon the conveyor 18, and thence to the conveyor 37 through the interconnecting mechanism illustrated in the drawing. Conveyors 18 and 37 will be driven in the direction of the arrows 47 and 47', respectively. Due to the construction and arrangement of said conveyors 18 and 37, as well illustrated in the drawing, the material which settles on the bottom of the tank 10 will be conveyed forwardly toward the influent end thereof where it will be discharged into a sump under the action of the lower run of conveyor 18. The upper run of conveyor 18 will perform a skimming operation upon the scum or floating matter, which will be largely grease which accumulates on top of the sewage in the tank 10, substantially along the line 61. This scum will be skimmed to the rear or effluent end of said tank 10 by flights 48.

Due to the overlapping relation of conveyor 37 with conveyor 18, the flights 49 of said conveyor 37 will continue the skimming operation after flights 48 of conveyor 18 have submerged below the surface of the sewage. Said conveyor 37 will then convey or skim the scum or floating material up the inclined chute 60 and into the transversely extending scum trough 15, from which it will flow by gravity through the lateral conduit 17 and into the grease well 16. It will be obvious that due to the overlapping relation of the conveyors 18 and 37, which is permitted by virtue of the fact that their movements are in the same plane, there will be a complete absence of stagnant or "dead spots" on the sewage surface. As a consequence, the surface of the sewage will be entirely free of scum or floating matter.

It is to be particularly noted, that as the flights 49 reach the scum trough 15 they are wiped clean of any adhering matter by the wiper 65, which insures a complete cleaning of said flights. Also, as the flights 49 are swung into the liquid in tank 10 they are lowered easily by cams 66 to prevent an undesirable splashing of the liquid.

After the settled material and the scum have been removed as aforesaid, the conveyors 18 and 37 will be allowed to remain in a non-operating condition for another extended period of time during which settling or sedimentation of the sewage is again allowed to take place, after which the above cycle of operation will be repeated.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In sedimentation apparatus, the combination with a settling tank, of a scum trough extending across one end portion of said tank, a sloping ramp leading to said trough from a position below the normal level of the liquid in the tank, the receiving edge of the ramp being submerged in the liquid, a chain flight conveyor having a scum removing run movable along the level of the liquid in the tank to transfer floating material therefrom to said trough, mechanism comprising two pairs of spaced-apart rails for supporting the chain flight conveyor scum-removing run in predetermined position relative to such liquid level, and stationary abutments parallel to said ramp and spaced therefrom one above each of said rails to prevent upward movement of the scum removing run when traveling along said ramp to said scum trough.

2. In sedimentation apparatus, the combination with a tank, of a scum trough, means comprising a skimming conveyor adapted to skim the surface of the liquid in the tank to move floating material into said trough and then move along a path above said trough, and a scraper at that edge of the trough remote from the receiving edge and at a high level relative to the latter in position to be wiped by the upwardly moving flight to dislodge adhering material from the latter into said trough.

3. In sedimentation apparatus, the combination with a tank, of a scum trough having a receiving edge at a relatively low level and the opposite edge at a relatively high level, means comprising a conveyor having a pivoted flight for transferring floating material from the tank over the lower edge of the trough into the latter, and a scraper at the higher edge of the trough in position to wipe adhering material from the flight into said trough as the flight passes by.

4. In sedimentation apparatus, the combination with a settling tank, of a scum trough, a chain conveyor comprising pivoted flights, means comprising supporting sprockets rotatable on horizontal axes for guiding the chain conveyor for movement of the flights along the surface of the liquid in the tank to transfer floating material to said trough and for subsequent movement of the flights upwardly along a path above said trough, and a scraper mounted in elevated position relative to the receiving edge of the trough and spaced therefrom in position to be wiped by the pivoted flights to effect removal therefrom of adhering material into said trough.

5. In sedimentation apparatus, the combination with a tank, of a scum trough having one wall with its upper edge at a relatively low level and its opposite wall with its upper edge at a relatively high level, a scraper at said upper edge, conveyor mechanism comprising a flight, and means for guiding said conveyor mechanism to cause said flight to transfer floating material from the surface of the liquid in the tank to said trough and then move said flight upwardly past said scraper at said higher edge of the trough along a path to cause the flight to wipe said scraper to dislodge adhering material from the flight into said trough.

6. In sedimentation apparatus, the combination with a sedimentation tank, of a scum trough, a conveyor comprising freely swingable pivoted flights, mechanism mounting said conveyor for movement of the pivoted flights along the surface of the liquid in the tank to transfer floating material into said trough and subsequently moving the flights along an upwardly curved path spaced above said trough, and an elongated scraper parallel to said flights and mounted in such curved path in an elevated position relative to the receiving edge of said trough for engagement by said flights to effect wiping therefrom of adhering material for passage into said trough.

7. In sedimentation apparatus, the combination with a tank, of a scum conveyor comprising flexible draft mechanism with a flight pivoted thereto, means for directing the flexible draft mechanism for movement of the flight along a curved path to a position for skimming along the surface of the liquid in the tank to convey floating material, and curved cam mechanism in position to be engaged by the flight while moving along such curved path to effect gradual swinging of said flight on its pivotal connection to said flexible draft mechanism to cause said flight to enter the liquid gradually.

8. In sedimentation apparatus, the combination with a tank, of a scum conveyor comprising flexible draft mechanism with a flight pivoted thereto for movement therewith in an orbital path, the conveyor having a lower run for suspending the flight in a vertical position dipping into the liquid in the tank and an upper run for supporting the flight in parallelism with the flexible draft mechanism, and curved cam mechanism spaced from one end of said orbital path of travel of said draft mechanism in position for engagement by said flight to effect gradual swinging of the flight to its suspended vertical position and gradual entry of the flight into the liquid at the beginning of its scum removing run.

9. In sedimentation apparatus, the combination with a tank, of a conveyor comprising flexible draft mechanism with a flight pivoted thereto for movement downward to skimming position at the surface of the liquid in the tank, and spaced-apart cams mounted adjacent the beginning of the skimming run in position to be engaged by the end portions of said flight to effect gradual swinging of the latter as it moves downwardly to said surface and thereby effect gradual entry of the flight into the liquid with minimum disturbance thereof.

10. In sedimentation apparatus, the combination with a settling tank, of a scum trough extending across one end portion of said tank, a sloping ramp leading to said trough from a position below the normal level of the liquid in the tank, the receiving edge of the ramp being submerged in the liquid, a chain flight conveyor having a scum removing run movable along the level of the liquid in the tank to transfer floating material therefrom to said trough, mechanism comprising spaced-apart rails for supporting the chain flight conveyor scum-removing run in predetermined position relative to such liquid level, and stationary abutments parallel to said ramp and spaced therefrom one above each of said rails to prevent upward movement of the scum removing run when traveling along said ramp to said scum trough.

11. In sedimentation apparatus, the combination with a tank, of flight conveyor mechanism mounted thereon to extend thereacross and comprising flexible draft means, means guiding said draft means around a fixed axis, a flight pivoted to said draft means, an arcuate cam mechanism positioned adjacent said fixed axis having the top thereof above said axis and the bottom thereof below said axis, the upper portion of said cam mechanism being concentric with said axis, and the lower portion thereof being more widely spaced from said axis, the spacing of said concentric portion being such as to confine said flight to move edgewise when moved downwardly toward the surface of the liquid in the tank and said more widely spaced portion guiding said flight for gradual swing by gravity into the liquid surface and into upright position for conveying travel along the surface of the liquid.

ROBERT E. BRIGGS.